(12) United States Patent
Fregly et al.

(10) Patent No.: US 11,841,930 B1
(45) Date of Patent: *Dec. 12, 2023

(54) ORIGIN AND OWNERSHIP VERIFICATION OF A DIGITAL OBJECT IN A DIGITAL OBJECT ARCHITECTURE

(71) Applicant: VERISIGN, INC., Reston, VA (US)

(72) Inventors: Andrew Fregly, Reston, VA (US); Najmehalsadat Miramirkhani, Stony Brook, NY (US); Swapneel Sheth, Fairfax, VA (US)

(73) Assignee: Verisign, Inc., Reston, VA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/164,356

(22) Filed: Feb. 1, 2021

Related U.S. Application Data

(63) Continuation of application No. 16/041,618, filed on Jul. 20, 2018, now Pat. No. 10,909,222.

(51) Int. Cl.
*G06F 21/12* (2013.01)
*H04L 9/32* (2006.01)
*G06F 16/955* (2019.01)
*H04L 9/30* (2006.01)

(52) U.S. Cl.
CPC ........ *G06F 21/128* (2013.01); *G06F 16/9566* (2019.01); *H04L 9/30* (2013.01); *H04L 9/3247* (2013.01)

(58) Field of Classification Search
CPC ......... H04L 9/08; H04L 9/006; H04L 9/3247; H04L 9/3263; H04L 61/1511; H04L 63/0823; H04L 63/123; H04L 9/30; G06F 21/6218; G06F 21/6227; G06F 21/128; G06F 16/9566
See application file for complete search history.

(56) References Cited

U.S. PATENT DOCUMENTS

| | | | |
|---|---|---|---|
| 6,367,013 B1 | 4/2002 | Bisbee et al. | |
| 7,162,635 B2 * | 1/2007 | Bisbee | G06Q 20/389 713/176 |
| 7,664,949 B2 | 2/2010 | England et al. | |
| 7,676,835 B2 * | 3/2010 | Brannon | H04L 9/3213 726/10 |
| 8,289,135 B2 | 10/2012 | Griffin | |
| 8,316,443 B2 | 11/2012 | Rits et al. | |
| 8,793,487 B2 | 7/2014 | Epstein et al. | |
| 8,954,742 B2 | 2/2015 | Darbellay et al. | |
| 9,253,087 B2 * | 2/2016 | Zhang | H04L 67/568 |
| 9,887,975 B1 | 2/2018 | Gifford et al. | |
| 9,912,486 B1 | 3/2018 | Sharifi | |
| 10,410,213 B2 * | 9/2019 | Heyner | G06F 21/60 |
| 10,505,741 B1 * | 12/2019 | Conley | H04L 63/123 |
| 10,708,256 B1 * | 7/2020 | Kane-Parry | H04L 63/0823 |
| 10,841,295 B1 * | 11/2020 | Pecen | H04L 9/3268 |

\* cited by examiner

*Primary Examiner* — Hosuk Song
(74) *Attorney, Agent, or Firm* — Lee & Hayes, P.C.

(57) ABSTRACT

A technique for verifying an origin of a digital object in a digital object architecture is described. The technique includes the steps of receiving, from a handle registry, handle information for a digital object that includes an attestation that references the handle identification value for the handle and origin identification information; verifying the authenticity of the attestation; after verifying the authenticity of the attestation, using the origin information in determining authorizations applicable to the digital object.

20 Claims, 4 Drawing Sheets

ORIGIN AND OWNERSHIP VERIFICATION OF A DIGITAL OBJECT IN A DIGITAL OBJECT ARCHITECTURE

CROSS-REFERENCE TO RELATED APPLICATIONS

This application is a continuation of the co-pending U.S. patent application titled, "ORIGIN AND OWNERSHIP VERIFICATION OF A DIGITAL OBJECT IN A DIGITAL OBJECT ARCHITECTURE," filed on Jul. 20, 0218 and having Ser. No. 16/041,618. The subject matter of this related application is hereby incorporated herein by reference.

BACKGROUND

Field of the Various Embodiments

The various embodiments relate generally to Internet infrastructure and, more specifically, to origin and ownership verification of a digital object in a digital object architecture.

Description of the Related Art

The World Wide Web includes a multitude of interconnected web servers that store and provide access to various types of digital resources, including web pages, images, movie files, documents, and so forth. A user of the World Wide Web can access a given digital resource (digital object) via a uniform resource locator (URL). The URL includes a domain name corresponding to the web server that stores the digital resource and a path segment indicating the location of the digital resource on that web server. When the user accesses the URL via a browser, the browser uses domain name system (DNS) resolution to map the domain name portion of the URL to an Internet protocol (IP) address corresponding to the web server. The browser then connects to the web server using that IP address and submits a request for the digital resource to the web server, where the request includes the path segment portion of the URL. The web server then retrieves the digital resource based on the path segment included in the request and, finally, returns the digital resource to the user via the browser.

If the digital resource is moved to a different location on the web server, moved to a different web server, or removed from the web server altogether, then the associated URL can no longer be used to access the digital resource. One consequence of this particular issue is that many web servers and corresponding web pages are associated with URLs that cannot be used to access underlying digital resources and are therefore considered to be "broken."

To address the problem of broken URLs, a digital object identifier approach has been defined as part of the digital object architecture (DOA). This approach also provides a mechanism for tracking and maintaining digital objects within the World Wide Web. The tracking mechanism may use, for example, a unique "handle identifier" (handle ID) to identify a digital object and have these identifiers registered into globally accessible handle registries. Registered handle IDs can then serve as lookup keys into handle registries with handle registry entries (handles) then providing the current location of the digital object associated with a handle ID. This method allows the current location of a digital object to be retrieved from a handle registry so long as the handle for the digital object is updated with the digital object's location whenever it changes. The effect of this is that handle IDs can serve as permanent identifiers for use in retrieving digital objects. This addresses the "broken" URL problem that can occur when URLs are used as digital object identifiers.

The term "digital object" may refer to, for example, any type of data having any format and, in some cases, any associated metadata. For example, and without limitation, a given digital object could be a Unicode text file, a Motion Picture Experts Group (MPEG) movie, a Portable Document Format (PDF) document, a Portable Network Graphics (PNG) image, a JavaScript Object Notation (JSON) object, or any combination of such data. Furthermore, a digital object can include a service endpoint, a server, or any other entity that can benefit from having a unique identifier associated therewith.

In the DOA paradigm, a digital object is assigned a handle ID where a handle ID includes a prefix portion and a suffix portion that, when combined, form a unique identifier. The prefix portion of the handle ID may indicate a specific handle registry that manages handle records (also referred to as "handles") which have the prefix as part of their handle identifier. Handles may include metadata associated with the digital object identified by the handle identifier. This metadata may indicate, among other things, a physical location where the digital object resides. The unique identifier portion of the handle ID is persistent and corresponds to the digital object regardless of the location of the digital object within the World Wide Web. Accordingly, the digital object can be located via the handle ID even when the location of the digital object changes.

One drawback of the DOA paradigm is incompatibility of handles under the "same origin" policy commonly employed in web application security models. When the same origin policy is employed, a web browser permits scripts contained in a first web page to access data in a second web page, but only if both web pages are recognized as having the same origin. Generally speaking, the "origin" of a web page is defined as a combination of the Uniform Resource Identifier (URI), the host name, and the port number associated with the web page. Among other things, implementing the same origin policy in a web browser prevents malicious code associated with one web page from obtaining access to sensitive data on or bound to another web page, performing actions that can compromise the other web page, and/or interrupting communications between the browser and the website. Thus, same origin policy enforces a strict separation between digital content provided by unrelated websites. Because the handle for a digital object does not include location information, a web browser accessing the digital object cannot determine the origin of the digital object and, therefore, cannot employ the same origin policy. Consequently, when a digital object is accessed using the DOA paradigm, the web browser accessing the digital object must either always trust the source of the digital object, which is quite dangerous from a basic network security perspective, or never trust the source of the digital object, which can substantially complicate navigation between websites and overall use of the Internet.

As the foregoing illustrates, what is needed in the art is an effective technique for supporting the same origin policy within the DOA infrastructure.

SUMMARY

An embodiment of the present disclosure sets forth a technique for verifying an origin of a digital object in a digital object architecture. The technique may include, for example, receiving, from a handle registry, handle information for a digital object that includes a handle identification value associated with the digital object, location information for the digital object, and an attestation bound to the handle identification value, where the attestation defines the origin and/or ownership for the digital object; verifying the authenticity of the attestation; and, after verifying the authenticity of the attestation, using the origin information in determining authorizations applicable to the digital object.

According to an embodiment, the technique may provide reliable verification of origin and ownership of digital objects registered in DOA via handles associated with the digital objects. As a result, extant Web applications that employ same-origin policy can function in DOA with little modification.

BRIEF DESCRIPTION OF THE DRAWINGS

So that the manner in which the above recited features of the disclosure can be understood in detail, a more particular description of the various embodiments, briefly summarized above, may be had by reference to aspects, some of which are illustrated in the appended drawings. It is to be noted, however, that the appended drawings illustrate only typical embodiments and are therefore not to be considered limiting of scope, for the contemplated embodiments may admit to other equally effective embodiments.

For clarity, identical reference numbers have been used, where applicable, to designate identical elements that are common between figures. It is contemplated that features of one example aspect may be incorporated in other example aspects without further recitation.

DETAILED DESCRIPTION

The descriptions of the various embodiments have been presented for purposes of illustration and are not intended to be exhaustive or limited in any way. Many modifications and variations will be apparent to those of ordinary skill in the art without departing from the scope and spirit of the described embodiments.

Figure 1:
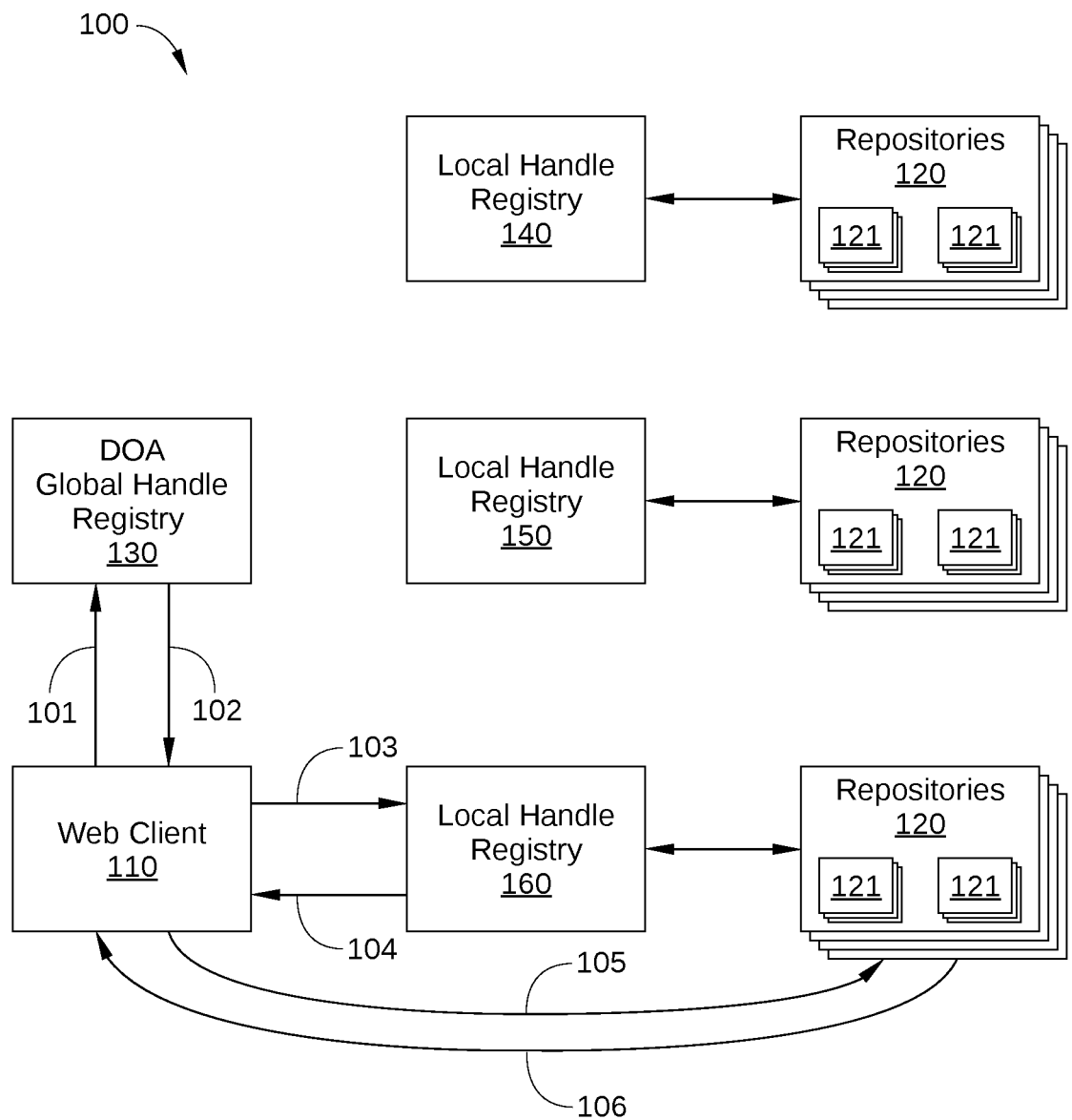
FIG. 1 is a conceptual illustration of a distributed computing system configured to implement one or more aspects of the various embodiments.

FIG. 1 is a conceptual illustration of a distributed computing system 100 configured to implement one or more aspects of the various embodiments. Distributed computing system 100 is based on the digital object architecture (DOA), which may be, for example, a general architecture for distributed information storage, location, and retrieval over the Internet. DOA may provide, for example, a framework of identity management capable of supporting a broad range of applications, including intellectual property, academic research and archives, big data, the Internet of Things, cloud computing, smart cities, and the like. DOA may organize digital objects, for example, by assigning a unique persistent identifier, or "handle ID," to each digital object, where the handle ID is disassociated from the current location of the digital object being identified. Specifically, each handle ID may provide indirect access to a particular digital object by means of a pointer contained in a handle identified by the handle ID and that is updated whenever the digital object is relocated to a different server or other repository. As a result, relocation of a digital object to a different server does not render the handle ID obsolete.

Distributed computing system 100 may include at least one or a plurality of repositories 120, which act as the DOA storage component, a DOA global handle registry 130, and local handle registries 140, 150, and 160, which act as the DOA registry component. The DOA global handle registry 130 and local handle registries 140, 150, and 160 may operate in conjunction with each other to implement a handle system that resolves the handle ID for a particular digital object to a handle containing the current location storing that digital object. A Web client 110, such as a web browser, interfaces with DOA global handle registry 130 and the appropriate local handle registry to access a particular handle pointing to digital object 121 stored in one of repositories 120. A digital object 121 may be, for example, a specific piece of content or service that resides on one of repositories 120 and can be accessed via the Internet. In some embodiments, a handle can include a structured record containing data, state information about the data, metadata, ownership, access methods, and/or permissions. In some embodiments, a handle includes pointers to one or more locations where related information can be found. In some embodiments, a digital object is a JavaScript object included in a webpage. In some embodiments, a digital object is a webpage.

Each of repositories 120 may be, for example, a container for storing digital objects 121, such as a web server or any other computing device connected to the Internet. Clients of a given repository 120 may add, access, update, and/or delete digital objects 121 stored therein. In some embodiments, each of repositories 120 is configured to create and assign a persistent handle ID to a digital object 121, and accesses to that digital object 121 will be performed using that handle ID through a specific interface protocol.

DOA global handle registry 130 and local handle registries 140, 150, and 160 may implement the handle system that resolves the handle ID for a particular digital object 121 into the current location for that digital object 121. According to an embodiment, DOA global handle registry 130 may manage the root of the handle system hierarchy, allocating and storing unique prefixes to each of local handle registries 140, 150, and 160 for that prefix, and providing a global service for mapping prefixes to the appropriate local handle registry. Local handle registries 140, 150, and 160 may make up a second level of the handle system hierarchy under the root, and maintain a prefix from which sub-prefixes can be allocated. Each of local handle registries 140, 150, and 160 can have a separate hierarchical structure and can also replicate horizontally in multiple sites. Further, in some embodiments, each of local handle registries 140, 150, and 160 stores a replica of DOA global handle registry 130.

Each of local handle registries 140, 150, and 160 may include a plurality of handles that are each associated with a respective digital object 121 stored in one of repositories 120. Each handle may have a unique identifier and may be associated with a digital object 121, and may be unique, persistent, and independent of the underlying physical or logical system employed in the storage of the associated digital object 121. Thus, each handle may include a handle ID and one or more records associated with a particular digital object 121. The handle ID for each handle may include a prefix that defines a namespace within the handle system of distributed computing system 100 and a locally unique identifier within the namespace identified by the prefix. In some embodiments, the prefix may be associated with a particular naming authority. Handle prefixes may be structured hierarchically, and a prefix manager can allocate sub-prefixes separated by a period. The hierarchy of the handle system may be written left to right (xxx.yyy). For example, in the handle system, the US Library of Congress has been allocated the handle prefix "loc," and can then allocate the sub-prefix "natlib" for its own purposes. The complete handle prefix would be "loc.natlib." Generally, handle IDs may be comprised of, for example, Unicode 2.0 characters.

According to an embodiment, each handle stored in local handle registries 140, 150, and 160 may also include one or more records, where each record can provide different metadata for the digital object 121 associated with that particular handle. For each handle, one record may include location information for the digital object 121 associated with that handle, such as an IP address, a URL, and the like. Each handle can also include an arbitrary number of additional records of arbitrary length, which can be in any technically feasible format. For example, in some embodiments, a record included in a handle can include data, state information about the data, metadata for the associated digital object 121, ownership of the associated digital object 121, access methods or permissions for the associated digital object 121, and the like.

In operation, Web client 110 may send a handle query 101 to DOA global handle registry 130 for a particular handle ID associated with a digital object 121 of interest. Based on the prefix information included in the handle ID, DOA global handle registry 130 may return service information 102 to Web client 110 indicating which of local handle registries 140, 150, or 160 manages that particular handle prefix. Web client 110 may then send a digital object request 103 to the appropriate local handle registry, e.g., local handle registry 160. Local handle registry 160 may then return a handle that contains a reference 104 to the current location or an access mechanism for the digital object 121 of interest. Typically, reference 104 may identify the appropriate repository 120 for the digital object 121 and an identifier for the object within that repository. Web client 110 may use information included in reference 104 to perform an access 105 of the digital object 121 of interest and receive returned information 106 from the appropriate repository. Web client 110 may then take action on the returned information 105, such as returning the digital object 121 to a user.

According to various embodiments, techniques are provided for verification of origin and/or ownership of digital objects registered in a DOA, such as digital objects 121 in FIG. 1. Specifically, origin and/or ownership of a digital object may be asserted via one or more attestations that are included or associated with a handle ID that identifies a digital object and its handle. When an attestation of origin or ownership is from a trusted attester, such as a certification authority, the attestation can be retrieved and used by Web client 110 to confirm origin and/or ownership of the digital object in support of current Web application security models. According to an embodiment, for example, a Web browser or Web application can use an origin attestation to determine what resources a digital object could access, create, or modify according to the requirements of same origin policy. Therefore, prior to accessing the digital object, the Web browser or Web application may verify the origin of the digital object based on an origin attestation included in or associated with the handle ID for the digital object. According to an embodiment, origin attestations and other forms of attestation, such as ownership attestations, may be bound to the handle ID based on the handle ID being identified in the attestation by an embedded assertion or identifier. Trust in origin attestations, ownership attestations, other forms of attestations, and assertions found in the attestations may be based on a verification mechanism that uses asymmetric cryptography and digital signatures on the attestations where the digital signature is from a trusted attester or certification authority. Web browser trust in origin and ownership attestations for digital objects may provide the basis for a Web browser to enact application and security capabilities applicable to the origin and ownership of the digital object. In some embodiments, attestations may be in data objects that reside outside handle registries, in which case the handle ID in such attestations may bind the attestations to a handle and digital object identified by the handle ID. In some embodiments, attestations may be embedded in handles, in which case a digital signature on the handle data that includes the handle ID and the other elements of an attestation serves as an attestation. Handles containing attestations may be made available to the Web browser from a handle registry, such as one of local handle registries 140, 150, or 160. One embodiment of such handle information is described below in conjunction with FIG. 2.

Figure 2:
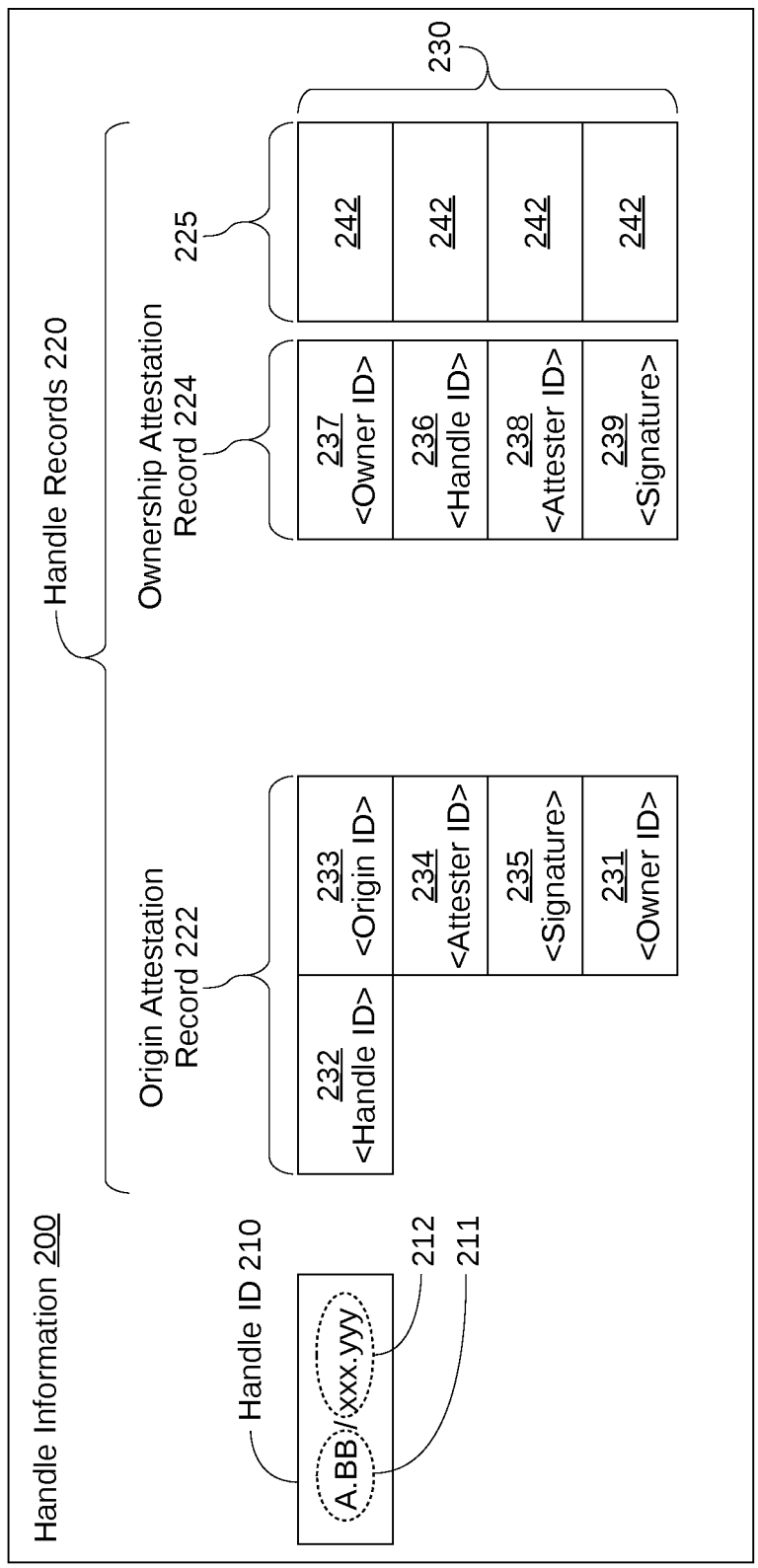
FIG. 2 is a block diagram illustrating handle information for a particular digital object in the distributed computing system of FIG. 1, according to various embodiments.

FIG. 2 is a block diagram illustrating handle information 200 for a particular digital object 121, according to various embodiments. Handle information 200 may include, for example, a handle ID 210, additional fields containing assertions that are needed by attestations that reside in the handle, and/or additional handle data not related to the attestations. Handle data may include one or more handle records 220, and is stored in one of local handle registries 140, 150, or 160. In addition, in some embodiments, each of local handle registries 140, 150, and 160 includes a handle/origin mapping that maps each handle registered with that local handle registry to a specific origin via a respective origin attestation. Additionally or alternatively, in some embodiments, each of local handle registries 140, 150, and 160 includes a handle/owner mapping that maps each handle registered with that local handle registry to a specific owner via a respective ownership attestation.

Handle ID 210 may include a prefix portion 211 and an identifier portion 212. Prefix portion 211 of handle ID 210 may indicate a specific namespace and determine the handle registry that manages the handle and related metadata associated with handle ID 210. For example, prefix portion 211 may indicate one of local handle registries 140, 150, or 160. Alternatively or additionally, prefix portion 211 can reference any other suitable naming authority. Identifier portion 212 may be, for example, a persistent identifier for a digital object within the namespace identified by the prefix, and corresponds to a particular digital object 121 regardless of the location of that particular digital object 121. Further, identifier portion 212 may be, for example, a text string that is unique relative to prefix portion 211. In some embodiments, handle ID 210 may be generated and assigned to a digital object 121 by a handle registration application executing in a particular local handle registry. The handle registration application may generate and assign a handle ID 210 when the handle is created and stored. Alternatively or additionally, the handle ID may be provided by the entity registering the handle, or the handle ID could be determined based on a naming convention, or the handle ID could be derived from other mechanisms that assure that the handle ID is unique. In some cases, when a digital object is to be stored within repositories 120 associated with a particular handle prefix, the repository may provide the identifier portion of the handle ID 210. In addition, when the digital object is stored within the appropriate repository 120, the handle registration application may populate a handle/origin attestation and/or a handle/owner attestation associated with origins and owners defined within the repository or associated with some other origin identified as part of handle registration processing.

Handle information 200 can include a plurality of N handle records 220 of arbitrary size. That is, each of handle records 220 can include any suitable number of fields 230. In some embodiments, fields 230 can each have an arbitrary length and format. Alternatively, in some embodiments, the fields 230 of handle records 220 can each have a format that is specified for use in distributed computing system 100. In addition to the expected records employed in DOA systems, handle information 200 may include at least an origin attestation record 222, among others. In some embodiments, as illustrated in origin attestation record 222, a single record can serve to identify origin and act as an origin attestation. In some embodiments, handle information 200 may further include an ownership attestation record 224, and/or additional records 225. Alternatively, in some embodiments, the fields 230 of origin attestation record 222 and ownership attestation record 224 may be included in a single attestation record. Origin attestation record 222 may include, for example, one or more fields 233 for an origin identifier. The origin identifier can be a text string of any suitable format. For example, in some embodiments, location record 221 may include, for example, a suitably configured domain name, pointer, IP address, or other origin identifier for the digital object 121. According to an embodiment, the origin identifier included in origin record 222 can be trusted by a Web browser or other Web client 110 because the origin identifier is an element of origin attestation record 222 and the origin attestation is verifiable, as described below.

Origin attestation record 222, and information included therein, can be employed by a client to verify an origin may be bound to a handle ID and the digital object that the handle ID identifies. For example, in the embodiment illustrated in FIG. 2, origin attestation record 222 includes a handle ID value in a handle ID field 232, an origin identifier value (also referred to as an "origin assertion") in an origin field 233, an attester identifier value in an attester field 234, and an attester digital signature (on Handle ID value, the Origin ID value, and the Attester ID) in signature field 235. In some embodiments, origin attestation record 222 may further include an owner ID value in an owner ID field 231.

In some embodiments, handle records 220 include one or more additional records 225 for other metadata associated with digital object 121. In such embodiments, handle records 220 may include an additional record for different categories of digital objects 121. For example, handle records 220 can include a specific record for electronic books, where the fields 242 of that record are for bibliographic data and/or other metadata specific to electronic books. Alternatively or additionally, handle records 220 can include a specific record for web sites, where one of fields 242 is for a web site indicator and the other fields 242 are for data and/or metadata specific to websites. Furthermore, handle records 200 can include an additional record 225 for any other technically feasible category or categories of digital objects 121. It is noted that the information included in additional records 225 may be searchable, which facilitates the detection of handle information 200 (and the digital object associated thereby) by search engines or other searching applications.

In some embodiments, Web client 110 can verify that the origin identifier (i.e., origin ID 233) is authentic based on information included in origin attestation record 222. Specifically, Web client 110 can use the attester digital signature value and the attester identifier value to verify that an attester that generated origin attestation record 222 is a trusted certification authority. In some embodiments, Web client 110 may look up a public key for an attester based on the attester identifier value in attester field 234. For example, the public key can be looked up in a trust store available to Web client 110. The public key found in this way can be used by Web client 110 to verify that the attester digital signature value in signature field 235 is valid and that the attester indicated by the attester identifier value in attester field 234 did actually generate origin attestation record 222. If so, then the information included in origin attestation record 222 can be trusted based on trust in the attester. Consequently, Web client 110 then knows the authenticated origin of digital object 121, and can access digital object 121 accordingly.

In some embodiments, prior to accessing a digital object, a Web browser or other client may also verify the ownership of the digital object via information in an ownership attestation that is included in handle information 200. In such embodiments, handle information 200 for the digital object may include an ownership attestation record 224. Ownership attestation record 224 may include an owner identification value in an ownership field 237 (also referred to as an "ownership assertion"). The ownership identification value can be a text string of any suitable format, including, for example, an e-mail address, a handle ID, a media access control address (MAC address) of a particular device, and the like. Ownership attestation record 224 may also include a handle ID value in a handle ID field 236, an attester identifier value in an attester field 238, and an attester digital signature value in a signature field 239. In some embodiments ownership attestation record 224 may include one or more additional fields for other data or metadata associated with the owner of the digital object 121. Thus, a client accessing the digital object associated with handle information 200 can use the attester digital signature value and the attester identifier value to verify that the ownership identification value included in owner ID field 237 is the authenticated owner of the data object associated with handle ID 210. According to an embodiment, authentication of the ownership of digital object 121 can be performed in a similar fashion to that described above for authentication of the origin of digital object 121.

Figure 3:
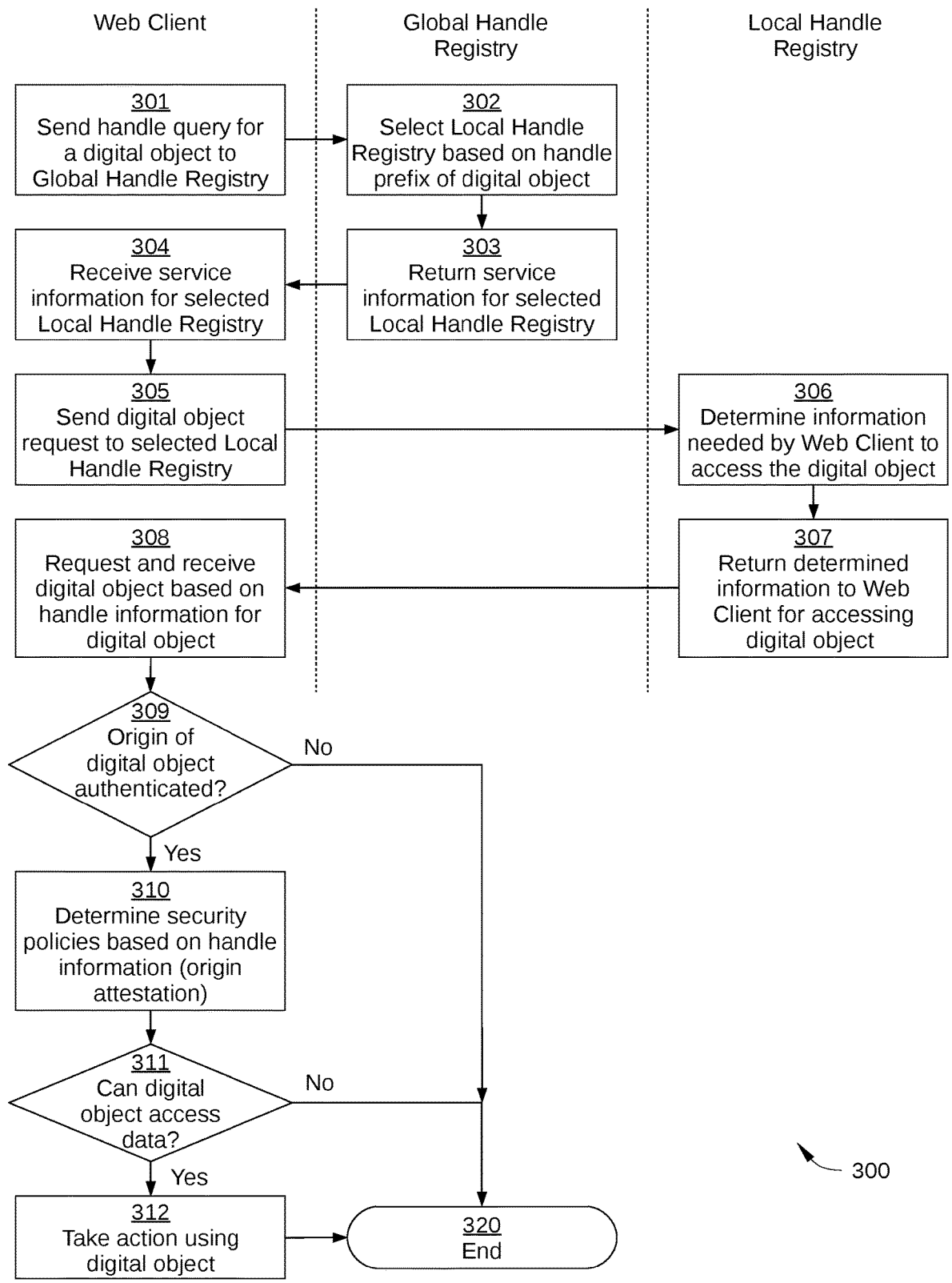
FIG. 3 is a flowchart of method steps for determining the origin and/or ownership of a digital object, according to various embodiments.

FIG. 3 is a flowchart of method steps for determining the origin and/or ownership of a digital object, according to various embodiments. Although the method steps are described with respect to the systems of FIGS. 1 and 2, the method steps can be performed in any order by any system.

Prior to when the method steps of FIG. 3 are implemented, a registration system may register origin attestations and/or ownership attestations for digital objects 121 included in distributed computing system 100. That is, origin attestations and/or ownership attestations may be included in the appropriate handle records of digital objects 121 in distributed computing system 100. The origin attestations may generally include, for example, information similar to origin attestation record 222 in FIG. 2, and the ownership attestations generally include information similar to ownership attestation record 224 in FIG. 2. According to an embodiment, for digital objects associated with a prefix associated with local handle registry 140, the registration system may register the origin attestations and/or ownership attestations in local handle registry 140, for digital objects associated with a prefix associated with local handle registry 150, the registration system may register the origin attestations and/or ownership attestations in local handle registry 150, and for digital objects with a prefix associated with local handle registry 160, the registration system may register the origin attestations and/or ownership attestations in local handle registry 160. In some embodiments, the registration system may include a registration application executing on one or multiple computing devices included in distributed computing system 100. In some embodiments, a registration system is associated with each of local handle registries 140, 150, and 160. Alternatively or additionally, in some embodiments, a registration system is associated with some or all of repositories 120.

As shown, a method 300 begins at step 301, where Web client 110 sends a handle query (handle lookup request) for a particular digital object 121 to DOA global handle registry 130. For example, in some embodiments, step 301 is performed by Web client 110 in response to a redirect or to the selection of a link by a user of Web client 110.

In step 302, DOA global handle registry 130 may receive the handle query and select one of local handle registry 140, 150, or 160, based on the handle prefix of the digital object referenced in the handle query. A local handle registry may handle prefix references for at least one prefix, but may handle multiple prefixes.

In step 303, DOA global handle registry 130 may return service information for the local handle registry selected in step 302, such as, for example, an IP address or the like.

In step 304, Web client 110 may receive the service information for the selected local handle registry.

In step 305, Web client 110 may send a handle lookup request to the selected local handle registry using the service information received in step 304.

In step 306, the selected local handle registry may receive a handle lookup request from Web client 110, and determine what information is needed to access the digital object in the containing repository, such as, for example, the repository ID and any information needed to identify the digital object within the repository.

In step 307, the selected local handle registry may return the information determined in step 306 and other handle information to Web client 110. The information may then used by Web client 110 to access the digital object. In some embodiments, the handle information 200 includes, for example, the contents of origin attestation record 222. Alternatively or additionally, in some embodiments, the handle information includes, for example, the contents of ownership attestation record 224. In some embodiments, the handle information 200 may identify an origin attestation record that is external to the local handle registry.

In step 308, based on the handle information received in step 307, Web client 110 may request the digital object from the appropriate repository and the repository returns the requested digital object 121.

In step 309, Web client 110 may determine the origin of the digital object 121 based on an origin attestation in handle information 200 received from the local handle registry. In some embodiments, Web client 110 also determines the ownership of the digital object 121 based on an ownership attestation in handle information 200 received from the local handle registry. Web client 110 may then determine whether the origin of the digital object included in the handle information is authentic, for example, by verifying the authenticity of the origin attestation included in handle information 200. If yes, method 300 proceeds to step 310; if no, method proceeds to step 320 and terminates.

Web client 110 may authenticate origin information included in the handle information such as, for example, by employing any technically feasible authentication protocol. In some embodiments, Web client 110 employs asymmetric cryptography to authenticate such origin information. In such embodiments, a digital signature included in the handle information, such as attester digital signature value in signature field 235, may enable verification of the authenticity of information included in the handle information 200 by verifying the authenticity of the origin attestation included in handle information 200. In some embodiments, Web client 110 further authenticates ownership information included in the handle information, for example via asymmetric cryptography by verifying the authenticity of the ownership attestation included in handle information 200.

In step 310, Web client 110 may determine security policies and data accessible to digital object 121 based on origin identified in the origin attestation.

In step 311, when digital object 121 attempts to access data, Web client 110 may determine if digital object 121 can access the data based on the origin attestation and an origin associated with the data. If yes, method 300 proceeds to step 311; if no, method proceeds to step 320 and terminates. In some embodiments, in step 310 Web client 110 may also determine the ownership of the digital object based on the ownership attestation received in step 308, and only proceeds to step 311 if the digital object has both the required origin and the required ownership. Furthermore, in some embodiments, Web client 110 uses origin information in determining any other authorizations applicable to digital object 121.

In step 312, Web client 110 may take appropriate action with the digital object received in step 307 from the local handle registry. Method 300 then proceeds to step 320 and terminates.

According to an embodiment, implementation of method 300 may enable same origin policy to be enforced in distributed computing system 100 by allowing origin attestations to be bound to handle IDs. According to an embodiment, enforcement of the same origin policy in distributed computing system 100 may prevent malicious code from one web page from obtaining access to sensitive data on another web page. For example, JavaScript code from an origin other than the web page currently accessed by Web client 110 is prevented from accessing data and functions associated by Web client 110 with that Web page, such as seeing Hypertext Transfer Protocol (HTTP) cookie information associated with the currently accessed web page, or manipulating content associated with the currently accessed web page.

As noted above, according to some embodiments, a registration system may support the creation and maintenance of origin and ownership attestations in local handle registries 140, 150, and 160. Specifically, the registration system may create, maintain, and access the required attestations and DOA handles in distributed computing system 100. In some embodiments, the registration system may be implemented as part of distributed computing system 100, e.g., by executing on Web client 110, repositories 120, and/or local handle registries 140, 150, and 160. Alternatively, in some embodiments, the registration system is implemented as part of an independent attestation creation and administrative system. In either case, the registration system may provide one or more of the following functions: registration of origin and ownership attestations in handle information 200 for the digital objects 121 of distributed computing system 100; maintenance of one or more interfaces to trusted attesters, such as certification authorities; verification that attestations registered in handle information 200 have been signed by trusted entities; deletion of origin and ownership attestations included in handle information 200; and replacement (i.e., rollover) of origin and ownership attestations included in handle information 200.

Figure 4:
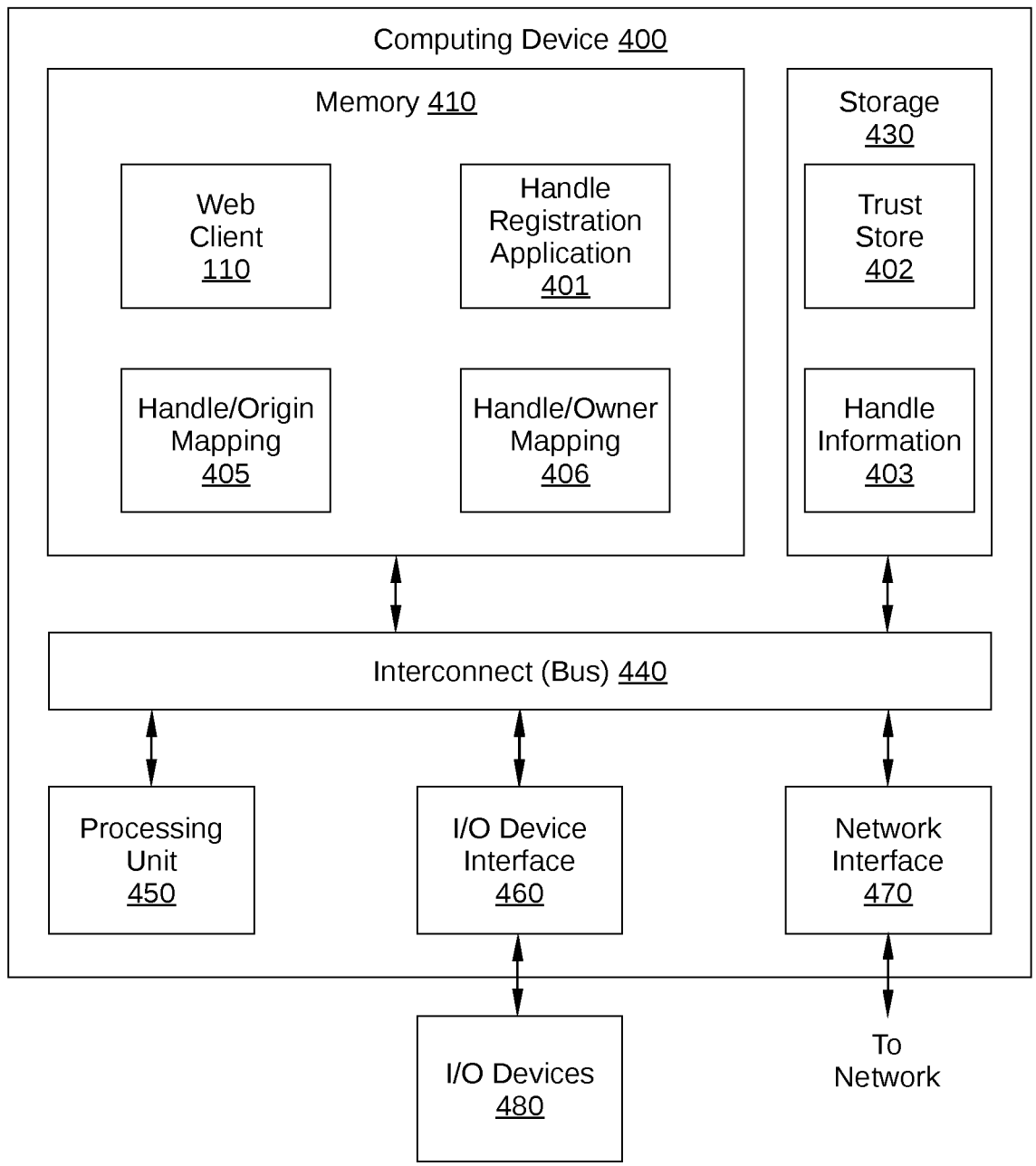
FIG. 4 is an illustration of a computing device, according to various embodiments.

The above-described registration system and Web client 110 each execute on one or more respective computing devices. One exemplary computing device is illustrated in FIG. 4. FIG. 4 is an illustration of a computing device 400, according to various embodiments. Computing device 400 may be a desktop computer, a laptop computer, a smart phone, electronic tablet or any other type of computing device suitable for practicing one or more embodiments of the present disclosure. In operation, computing device 400 is configured to execute one or more of a handle registration application 401 and/or Web client 110, as described herein. It is noted that the computing device described herein is illustrative and that any other technically feasible configurations fall within the scope of the present disclosure.

As shown, computing device 400 includes, without limitation, an interconnect (bus) 440 that connects a processing unit 450, an input/output (I/O) device interface 460 coupled to input/output (I/O) devices 480, memory 410, a storage 430, and a network interface 470. Processing unit 450 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU or digital signal processor (DSP). In general, processing unit 450 may be any technically feasible hardware unit capable of processing data and/or executing software applications, including handle registration application 401 and/or Web client 110. Further, in the context of this disclosure, the computing elements shown in computing device 400 may correspond to a physical computing system (e.g., a system in a data center) or may be a virtual computing instance executing within a computing cloud.

I/O devices 480 may include devices capable of providing input, such as a keyboard, a mouse, a touch-sensitive screen, and so forth, as well as devices capable of providing output. Additionally, I/O devices 480 may include devices capable of both receiving input and providing output, such as a touchscreen, a universal serial bus (USB) port, and so forth. I/O devices 480 may be configured to receive various types of input from an end-user of computing device 400, and to also provide various types of output to the end-user of computing device 400, such as displayed digital images or digital videos. In some embodiments, one or more of I/O devices 480 are configured to couple computing device 400 to a network.

Memory 410 may include a random access memory (RAM) module, a flash memory unit, or any other type of memory unit or combination thereof. Processing unit 450, I/O device interface 460, and network interface 470 are configured to read data from and write data to memory 410. Memory 410 includes various software programs that can be executed by processor 450 and application data associated with said software programs, including handle registration application 401 and/or Web client 110. In addition, in some embodiments, memory 410 includes a handle/origin mapping 405 and/or a handle/owner mapping 406. Storage 430 may include any technically feasible nonvolatile storage medium. In some embodiments, storage 430 includes a trust store 402, which stores certificates from trusted attesters (for example, recognized certificate authorities), and/or handle information 403. Additionally or alternatively, trust store 402 and/or handle information 403 may reside in memory 410.

In sum, techniques described herein enable origin and/or ownership of digital objects to be registered in a DOA-based system by a client operating in the system. An attestation from a trusted attester is included in a handle record associated with a digital object and asserts the origin and/or ownership of the digital object. Accordingly, the attestation can be retrieved and used by a Web client to confirm origin and/or ownership of the digital object in support of current Web application security models.

At least one advantage of at least one of the disclosed techniques is that it provides reliable verification of origin and ownership of digital objects registered in DOA via handles associated with the digital objects. As a result of this technological advancement over prior art approaches, extant Web applications that employ same-origin policy can function in DOA with little modification, which enables DOA as an Internet and Web infrastructure.

1. In some embodiments, a computer-implemented method for verifying an origin of a digital object in a digital object architecture comprises receiving, from a handle registry, handle information for a digital object that includes a handle identification value associated with the digital object, origin information for the digital object, and an attestation that references the handle identification value and the origin information, verifying the authenticity of the attestation, and after verifying the authenticity of the attestation, using the origin information in determining authorization to access the digital object.

2. The method of clause 1, wherein the attestation includes a digital signature of a trusted attester.

3. The method of clause 1 or 2, wherein verifying authenticity of the attestation comprises selecting a public key associated with the trusted attester, and confirming that the digital signature was generated with a private key of the trusted attester.

4. The method of any of clauses 1-3, wherein the origin information does not include domain information.

5. The method of any of clauses 1-4, wherein the handle registry comprises a local handle registry associated with the repository.

6. The method of any of clauses 1-5, which further comprises sending to the handle registry a handle query for the handle information that includes the handle identification value.

7. The method of any of clauses 1-6, wherein the handle information further includes ownership information for the digital object.

8. The method of any of clauses 1-7, which further comprises verifying the ownership of the digital object based on the attestation and the ownership information.

9. The method of any of clauses 1-8, wherein the digital object is requested from a repository after verifying the ownership of the digital object.

10. The method of any of clauses 1-9, wherein the receiving, verifying, and using are performed by a Web browser or a Web application.

11. In some embodiments, a non-transitory computer-readable medium including instructions that, when executed by a processor, cause the processor to perform the steps of receiving, from a handle registry, handle information for a digital object that includes a handle identification value associated with the digital object, origin information for the digital object, and an attestation that references the handle identification value and the origin information, verifying the authenticity of the attestation, after verifying the authenticity of the attestation, selecting a repository based on the origin information from which to access the digital object, and requesting the digital object from the repository.

12. The non-transitory computer-readable medium of clause 11, wherein the attestation includes a digital signature of a trusted attester.

13. The non-transitory computer-readable medium of clause 11 or 12, wherein verifying authenticity of the attestation comprises selecting a public key associated with the trusted attester, and confirming that the digital signature was generated via a private key of the trusted attester.

14. The non-transitory computer-readable medium of any of clauses 11-13, wherein the origin information does not include domain information.

15. The non-transitory computer-readable medium of any of clauses 11-14, wherein the handle registry comprises a local handle registry associated with the repository.

16. The non-transitory computer-readable medium of any of clauses 11-15, which further comprises sending to the handle registry a handle query for the handle information that includes the handle identification value.

17. The non-transitory computer-readable medium of any of clauses 11-16, wherein the handle information is generated and stored in the handle registry by a registration application.

18. The non-transitory computer-readable medium of any of clauses 11-17, wherein the registration application is associated with the repository.

19. The non-transitory computer-readable medium of any of clauses 11-18, wherein the registration application is associated with the handle registry.

20. In some embodiments a system comprises a memory storing instructions, and a processor that is coupled to the memory and, when executing the instructions, is configured to perform the steps of receiving, from a handle registry, handle information for a digital object that includes a handle identification value associated with the digital object, origin information for the digital object, and an attestation that references the handle identification value and the origin information, verifying the authenticity of the attestation, after verifying the authenticity of the attestation, selecting a repository based on the origin information from which to access the digital object, and requesting the digital object from the repository.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure has been described above with reference to specific embodiments. Persons of ordinary skill in the art, however, will understand that various modifications and changes may be made thereto without departing from the broader spirit and scope of the disclosure as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

We claim:

1. A computer-implemented method for verifying an origin of an object, the method comprising:
receiving tracking information for an object in a digital architecture, wherein the tracking information comprises: (i) origin information for the object, and (ii) an attestation that references the origin information;
verifying authenticity of the attestation; and
after verifying the authenticity of the attestation, using the origin information in determining authorization to access the object.

2. The computer-implemented method of claim 1, wherein the attestation comprises a digital signature of a trusted attester.

3. The computer-implemented method of claim 1, wherein the origin information does not include domain information.

4. The computer-implemented method of claim 1, wherein the tracking information further comprises ownership information for the object.

5. The computer-implemented method of claim 4, further comprising:
verifying the ownership of the object based on the attestation and the ownership information; and
upon verifying the ownership of the object, requesting the object from a repository.

6. The computer-implemented method of claim 1, wherein the tracking information is stored as a handle in a first handle registry.

7. The computer-implemented method of claim 6, further comprising sending a tracking query to a global handle registry, wherein the global handle registry is configured to identify the first handle registry as a local handle registry storing the tracking information.

8. The computer-implemented method of claim 1, wherein the tracking information further comprises a tracking identification value associated with the object.

9. The computer-implemented method of claim 1, wherein a registration application generates and stores the tracking information in a registry.

10. The computer-implemented method of claim 1, wherein the origin information is generated separately from the attestation.

11. One or more non-transitory computer-readable media storing instructions that, when executed by one or more processors, cause the one or more processors to verify an origin of an object by performing the steps of:
receiving tracking information for an object in a digital architecture, wherein the tracking information comprises: (i) origin information for the object, and (ii) an attestation that references the origin information;
verifying authenticity of the attestation; and
after verifying the authenticity of the attestation, using the origin information in determining authorization to access the object.

12. The one or more non-transitory computer-readable media of claim 11, wherein the origin information does not include domain information.

13. The one or more non-transitory computer-readable media of claim 11, further comprising instructions that, when executed by the one or more processors, cause the one or more processors to perform the step of sending a tracking query to a global handle registry, wherein:
the global handle registry is configured to identify a first handle registry as a local handle registry storing the tracking information; and
the first handle registry is configured to store the tracking information as a handle.

14. The one or more non-transitory computer-readable media of claim 11, wherein the tracking information further comprises a tracking identification value associated with the object.

15. The one or more non-transitory computer-readable media of claim 11, further comprising instructions that, when executed by the one or more processors, cause the one or more processors to perform the steps of:
verifying ownership of the object based on the attestation and on ownership information for the object; and
upon verifying the ownership of the object, requesting the object from a repository.

16. The one or more non-transitory computer-readable media of claim 11, wherein the origin information is generated separately from the attestation.

17. A system for verifying an origin of an object, the system comprising:
a memory storing instructions; and
a processor coupled to the memory that executes the instructions by performing the steps of:
receiving tracking information for an object in a digital architecture, wherein the tracking information comprises: (i) origin information for the object, and (ii) an attestation that references the origin information;
verifying authenticity of the attestation; and
after verifying the authenticity of the attestation, using the origin information in determining authorization to access the object.

18. The one or more non-transitory computer-readable media of claim 11, wherein the origin information does not include domain information.

19. The one or more non-transitory computer-readable media of claim 11, wherein the tracking information further comprises a tracking identification value associated with the object.

20. The one or more non-transitory computer-readable media of claim 11, further comprising instructions that, when executed by the one or more processors, cause the one or more processors to perform the steps of:
verifying ownership of the object based on the attestation and on ownership information for the object; and
upon verifying the ownership of the object, requesting the object from a repository.

* * * * *